United States Patent
Huang et al.

(10) Patent No.: US 11,734,155 B2
(45) Date of Patent: Aug. 22, 2023

(54) FULLY TRACEABLE AND INTERMEDIATELY DETERMINISTIC RULE CONFIGURATION AND ASSESSMENT FRAMEWORK

(71) Applicant: Disney Enterprises, Inc., Burbank, CA (US)

(72) Inventors: Edward Huang, Rowland Heights, CA (US); Kazuhiro Kusunoki, Jackson Heights, NY (US); Pankaj Gambhir, Ho-Ho-Kus, NJ (US)

(73) Assignee: Disney Enterprises, Inc., Burbank, CA (US)

( * ) Notice: Subject to any disclaimer, the term of this patent is extended or adjusted under 35 U.S.C. 154(b) by 61 days.

(21) Appl. No.: 17/382,995

(22) Filed: Jul. 22, 2021

(65) Prior Publication Data
US 2023/0024024 A1 Jan. 26, 2023

(51) Int. Cl.
| | | |
|---|---|---|
| G06F 11/28 | (2006.01) | |
| G06F 11/07 | (2006.01) | |
| G06F 11/36 | (2006.01) | |
| G06N 5/022 | (2023.01) | |
| G06F 9/54 | (2006.01) | |
| G06N 5/025 | (2023.01) | |

(52) U.S. Cl.
CPC .......... G06F 11/3636 (2013.01); G06F 9/544 (2013.01); G06F 11/3632 (2013.01); G06N 5/022 (2013.01); G06N 5/025 (2013.01)

(58) Field of Classification Search
CPC .. G06F 11/3636; G06F 11/3632; G06F 9/544; G06N 5/025
See application file for complete search history.

(56) References Cited

U.S. PATENT DOCUMENTS

| | | | |
|---|---|---|---|
| 10,567,245 B1 * | 2/2020 | Patil | H04L 69/22 |
| 2002/0065793 A1 * | 5/2002 | Arakawa | G06F 7/36 |
| 2003/0097514 A1 * | 5/2003 | Ennis | G06F 13/128 |
| | | | 710/306 |
| 2009/0190592 A1 * | 7/2009 | Hsieh | H04L 47/10 |
| | | | 370/392 |
| 2010/0246446 A1 * | 9/2010 | Du | G06F 16/9027 |
| | | | 370/256 |
| 2020/0195552 A1 * | 6/2020 | Xu | H04L 45/08 |

OTHER PUBLICATIONS

Manish Kumar et al., Intrusion Detection System Using Decision Tree Algorithm, 2012, [Retrieved on Feb. 22, 2023]. Retrieved from the internet: <URL: https://ieeexplore.ieee.org/stamp/stamp.jsp?tp=&arnumber=6511281> 6 Pages (629-634) (Year: 2012).*

* cited by examiner

*Primary Examiner* — Anibal Rivera
(74) *Attorney, Agent, or Firm* — Patterson + Sheridan, LLP

(57) ABSTRACT

A method includes assessing an input in a buffer against a rule in a first node of a rule tree to determine that an action should be performed and updating the buffer with results of performing the action. The method also includes inserting an indication of the input, the rule, and the results of performing the action into a tracker log and passing the updated buffer to a second node in the rule tree in response to determining that the first node points to the second node.

18 Claims, 6 Drawing Sheets

FULLY TRACEABLE AND INTERMEDIATELY DETERMINISTIC RULE CONFIGURATION AND ASSESSMENT FRAMEWORK

BACKGROUND

Many systems use rule engines to automatically determine actions to perform in response to an existing condition or dataset. A conventional rule engine determines the rules in a rule bank that are applicable to the existing condition or dataset. These rules are retrieved from the rule bank and then applied in any order to determine actions that should be performed. Performing an action, however, may cause the condition or dataset to change (e.g., data may be added to or removed from the dataset). If the condition or dataset changes, then the rule engine needs to determine the rules in the rule bank that apply to the changed condition or dataset, effectively starting the analysis over. Because the rules may be applied in any order, the condition or dataset may change differently between different executions, which may lead to the rule engine producing inconsistent results for the same condition or dataset. Additionally, because the order in which the rules are applied is not deterministic, it may not be possible to replay or troubleshoot the application of the rules, which causes errors to remain undiagnosed and unresolved.

For example, an email application may store user-created rules to filter emails. These rules may specify that any number of actions (e.g., delete, move, highlight, reply, etc.) should be performed when an email satisfies certain conditions. If a user initiates a filtering process for emails in the user's Inbox, the email application may determine a subset of the user-created rules that are applicable to the Inbox. For example, there may be a first set of rules that should be applied if the Inbox includes a number of emails that exceeds a threshold and a second set of rules that should be applied if the Inbox includes emails that are over a week old. If the number of emails in the Inbox exceeds the threshold and the Inbox includes an email that is over a week old, then the email application determines that both sets of rules are applicable. The email application then applies the rules in both sets to the inbox to determine which actions should be performed.

Applying any one rule may change the condition of the Inbox. For example, one rule may specify that an email that is over a week old should be deleted. When that email is deleted, however, the number of emails in the Inbox is reduced. As a result, when that email is deleted, the email application re-evaluates which sets of rules apply to the Inbox, effectively starting the analysis over. As another example, if a new email is received during the filtering process, the email application re-evaluates which sets of rules apply to the Inbox, effectively starting over.

Additionally, the email application may not evaluate the rules in the two sets in a deterministic order. As a result, if a first rule requires that emails over a week old should be deleted and a second rule requires emails from the user's parents to be moved to a particular folder, then the order in which those rules are applied will impact how an email from the user's parents and that is over a week old would be treated. If the first rule is evaluated before the second rule, then the email would be deleted. If the second rule is evaluated before the first rule, then the email would be moved to the folder. Thus, the email application produces inconsistent results for the initial conditions. Moreover, it may be difficult to replay or troubleshoot the filtering process because the email application does not apply the rules in a deterministic order.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

This disclosure contemplates a server that implements a rule assessment framework to apply rules deterministically in certain embodiments. The server allows users to create rule trees that provide an ordered execution of rules. The nodes of the rule trees include rules and pointers to other nodes in the rule tree. The rules in the rule tree are applied in a particular order based on the pointers in the nodes. For example, the server receives a buffer and a key identifying a rule tree. The server passes the buffer to the rule tree identified by the key. The server then evaluates a rule in a first node of the rule tree (e.g., a root node) against an input in the buffer to determine whether an action in the first node should be performed. The server then updates the buffer with the results of the evaluation for the first node (e.g., the results of performing the action). The server then passes the updated buffer to a second node to which the pointer in the first node points. This process repeats until the last node in a branch of the rule tree (e.g., a node with a null pointer) is evaluated. By using this rule tree structure, the server processes a collection of rules in a deterministic order, which provides consistent results in certain embodiments. For example, because the order in which the collection of rules is processed remains consistent, the intermediate results of processing the rules also remains consistent.

In some embodiments, the server also updates a tracker log with information concerning the evaluation at each node (e.g., the input, the rule in the node, whether the action in the node is performed, and the results of performing the action may be added to the tracker log). The server uses the deterministic order of the rule processing and the information in the tracker log to replay and troubleshoot the processing of the rules. For example, because the intermediate results of processing the rules remains consistent due to the deterministic order in which the rules are processed, the processing of the rules is traceable. As a result, the server can detect, diagnose, and resolve errors within the rule tree in certain embodiments.

Figure 1A:
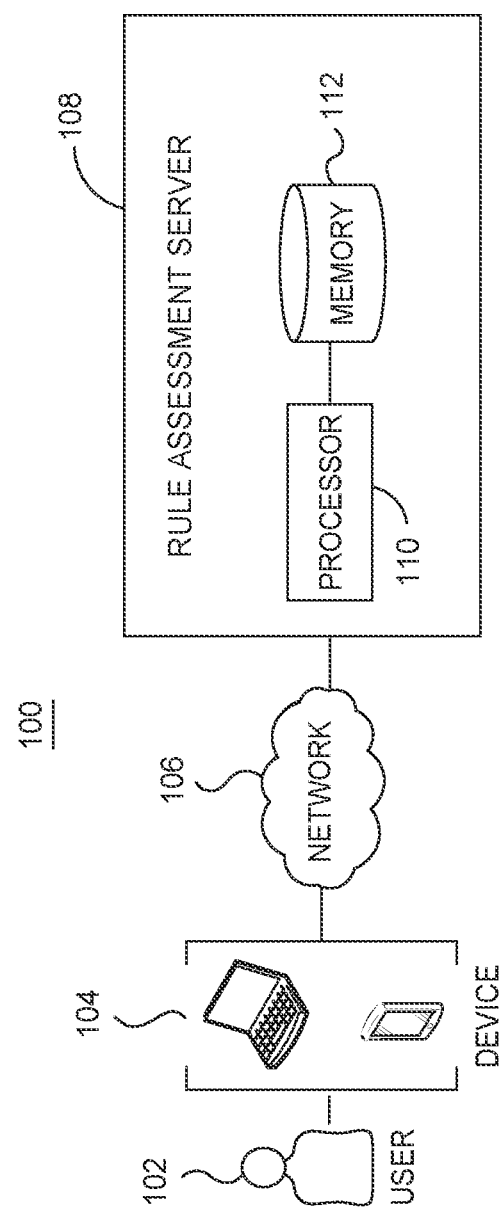
FIG. 1A illustrates an example system.

FIG. 1A illustrates an example system 100. As seen in FIG. 1A, the system 100 includes one or more devices 104, a network 106, and a rule assessment server 108. Generally, the rule assessment server 108 implements and evaluates rule trees following a functional programming paradigm. The rule assessment server 108 maintains one or more rule tree structures that each allow a collection of rules to be evaluated in a deterministic order. A device 104 communicates an input to the rule assessment server 108 and identifies a rule tree for the rule assessment server 108. The rule assessment server 108 then evaluates a sequence of rules embodied within the identified rule tree using the input to determine whether one or more actions should be performed. As a result, the rule assessment server 108 allows the sequence of rules to be evaluated in a deterministic order, which provides consistent results, in particular embodiments.

A user 102 uses a device 104 to create one or more rule trees in the rule assessment server 108. Additionally, the user 102 uses the device 104 to initiate evaluations using one or more rule trees in the rule assessment server 108. The device 104 is any suitable device for communicating with components of the system 100 over the network 106. As an example and not by way of limitation, the device 104 may be a computer, a laptop, a wireless or cellular telephone, an electronic notebook, a personal digital assistant, a tablet, or any other device capable of receiving, processing, storing, or communicating information with other components of the system 100. The device 104 may be a wearable device such as a virtual reality or augmented reality headset, a smart watch, or smart glasses. The device 104 may also include a user interface, such as a display, a microphone, keypad, or other appropriate terminal equipment usable by the user 102. The device 104 may include a hardware processor, memory, or circuitry configured to perform any of the functions or actions of the device 104 described herein. For example, a software application designed using software code may be stored in the memory and executed by the processor to perform the functions of the device 104.

The network 106 is any suitable network operable to facilitate communication between the components of the system 100. The network 106 may include any interconnecting system capable of transmitting audio, video, signals, data, messages, or any combination of the preceding. The network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

The rule assessment server 108 maintains one or more rule trees and performs the evaluation of an identified rule tree based on provided input. In particular embodiments, the rule tree structures allow the rule assessment server 108 to evaluate a collection of rules in a deterministic order, which provides consistent results for the same inputs. Because the order in which the collection of rules is processed remains consistent, the intermediate results of processing the rules also remains consistent. As seen in FIG. 1A, the rule assessment server 108 includes a processor 110 and a memory 112, which are configured to perform any of the functions or actions of the rule assessment server 108 described herein. For example, the memory 112 may store one or more rule trees and software code. The processor 110 executes the software code stored in the memory 112 to create the one or more rule trees or to evaluate a collection of rules embodied within a rule tree using provided input.

In certain embodiments, the rule assessment server 108 allows the user 102 to quickly create complex logic and state machines embodied as the rule trees. For example, the rule assessment server 108 may operate with the device 104 to provide a graphical user interface through which the user 102 may create or define rules (e.g., set conditions and corresponding actions to be performed in the conditions are satisfied). After creating or defining the rules, the user 102 may use the graphical user interface to create rule trees based on the rules. The user 102 may use different sets of the defined rules to create different rule trees. For each rule tree, the user 102 may link different rules in a desired order to establish the order in which the rules are assessed. In this manner, the rule assessment server 108 allows rules to be reused across multiple rule trees.

The processor 110 is any electronic circuitry, including, but not limited to one or a combination of microprocessors, microcontrollers, application specific integrated circuits (ASIC), application specific instruction set processor (ASIP), or state machines, that communicatively couples to memory 112 and controls the operation of the rule assessment server 108. The processor 110 may be 8-bit, 16-bit, 32-bit, 64-bit or of any other suitable architecture. The processor 110 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 110 may include other hardware that operates software to control and process information. The processor 110 executes software stored on the memory 112 to perform any of the functions described herein. The processor 110 controls the operation and administration of the rule assessment server 108 by processing information (e.g., information received from the devices 104, network 106, and memory 112). The processor 110 is not limited to a single processing device and may encompass multiple processing devices.

The memory 112 may store, either permanently or temporarily, data, operational software, or other information for the processor 110. The memory 112 may include any one or a combination of volatile or non-volatile local or remote devices suitable for storing information. For example, the memory 112 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 112, a disk, a CD, or a flash drive. In particular embodiments, the software may include an application executable by the processor 110 to perform one or more of the functions described herein.

Figure 1B:
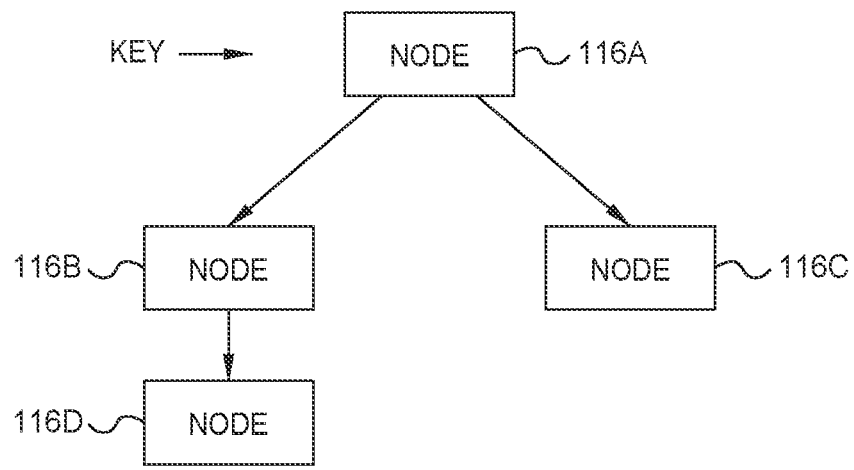
FIG. 1B illustrates an example rule tree.

FIG. 1B illustrates an example rule tree 114. As discussed previously, a user 102 may have used a device 104 to create the rule tree 114, and the rule assessment server 108 stores and evaluates the rule tree 114. The rule tree 114 includes one or more nodes 116 that are organized in a tree structure. Each node 116 includes a rule that can be evaluated against provided input, and some of the nodes 116 include one or more pointers to other nodes 116 in the rule tree 114. A user 102 may use a device 104 to create any number of rule trees 114. Furthermore, the rule assessment server 108 may store any number of rule trees 114 or retrieve any number of rule trees 114 stored in an external database. Each of the rule trees 114 may include any suitable number of nodes 116 organized in any suitable tree structure.

In the example of FIG. 1B, the rule tree 114 includes nodes 116A, 116B, 116C, and 116D. The node 116A is the first node in the rule tree 114 and may be referred to as the root node. The node 116A includes pointers to the nodes 116B and 116C. Additionally, the node 116B includes a pointer to the node 116D. As a result, the node 116A is the root node of the rule tree 114. The nodes 116B and 116C are child nodes of the node 116A. The node 116D is a child node of the node 116B. The nodes 116C and 116D may have null pointers, indicating that the nodes 116C and 116D are leaf nodes that terminate their respective branches of the rule tree 114.

The rule tree 114 is identified by a key. The key may include a sequence of characters or values that uniquely identify the rule tree 114 in the rule assessment server 108. Stated differently, each rule tree 114 in the rule assessment server 108 may be identified with a different key. A device 104 may communicate a key to the rule assessment server 108 to indicate the rule tree 114 that the device 104 wants to use. For example, the rule assessment server 108 may communicate a list of rule trees maintained by the rule assessment server 108 to the device 104. The user 102 then selects a desired rule tree 114 in the list by interacting with a graphical user interface on the device 104. The device 104 then communicates a key that identifies the selected rule tree 114 to the rule assessment server 108. The rule assessment server 108 determines the rule tree 114 that has an identifier that matches the provided key. The rule assessment server 108 then evaluates the determined rule tree 114 against provided input to determine whether certain actions should be performed in response to the input.

Additionally, as seen in FIG. 1B, the rule tree 114 enforces a particular order in which the nodes 116A, 116B, 116C and 116D are evaluated. The node 116A is evaluated first. The nodes 116B and 116C may be evaluated depending on the results of the evaluation of the node 116A. The node 116D may be evaluated based on the results of evaluating the node 116B. Because the rule tree 114 provides a deterministic ordering of the nodes 116, when the rule assessment server 108 evaluates the rule tree 114 against provided input, consistent results should be produced for the same inputs, in particular embodiments.

Figure 1C:
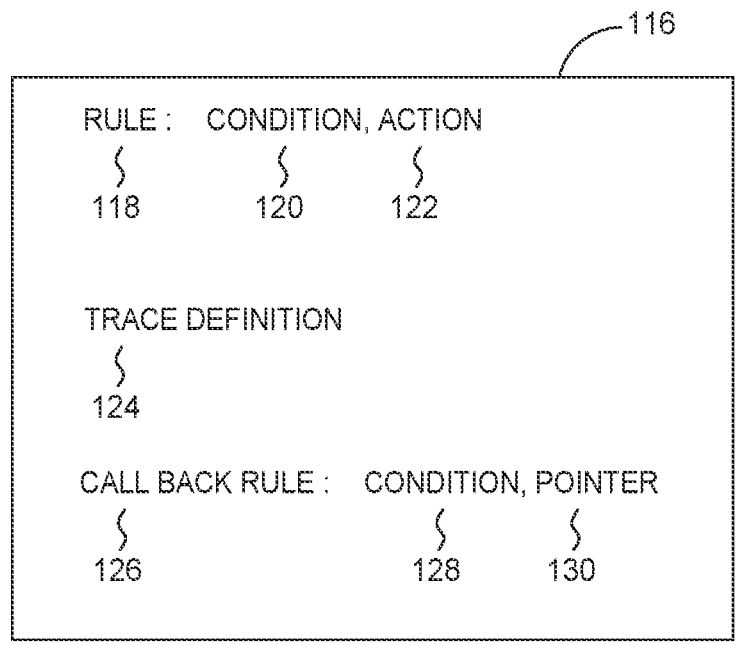
FIG. 1C illustrates an example node in the rule tree of FIG. 1B.

FIG. 1C illustrates an example node 116 in the rule tree 114 of FIG. 1B. As seen in FIG. 1C, the node 116 includes a rule 118 that includes a condition 120 and an action 122. When the rule assessment server 108 evaluates the node 116, the rule assessment server 108 determines whether the provided input satisfies the condition 120 of the rule 118. Depending on whether the condition 120 is satisfied, the rule assessment server 108 determines whether the action 122 should be performed. If the condition 120 is satisfied, the rule assessment server 108 performs the action 122. If the condition 120 is not satisfied, the rule assessment server 108 does not perform the action 122. The node 116 may include any suitable number of rules 118 that specify any suitable number of conditions 120 and any suitable number of actions 122.

The node 116 also includes a trace definition 124 that specifies the information that should be logged when evaluating the node 116. For example, the trace definition 124 may indicate that one or more of the provided input, the condition 120, the action 122, or the results of performing the action 122 should be included in a tracker log when the node 116 is evaluated. When the rule assessment server 108 evaluates the node 116, the rule assessment server 108 adds the information specified by the trace definition 124 into the tracker log. In certain embodiments, the tracker log allows for the rule tree 114 to be replayed or debugged. For example, the rule assessment server 108 may step through the tracker log to determine whether the rule 118 was defined properly and whether the action 122 was performed.

The node 116 further includes a callback rule 126 that includes a condition 128 and a pointer 130. The rule assessment server 108 may evaluate the callback rule 126 to determine the next node 116 in the rule tree 114 that should be evaluated. Specifically, the rule assessment server 108 evaluates whether the provided input or the results of performing an action 122 satisfy the condition 128. If the condition 128 is satisfied, the rule assessment server 108 proceeds to a node 116 to which the pointer 130 points. If the condition 128 is not satisfied, the rule assessment server 108 does not proceed to the node 116 to which the pointer 130 points. The node 116 may include any suitable number of callback rules 126, conditions 128, and pointers 130. For example, the node 116A in FIG. 1B may include two call back rules 126 with two different conditions 128 and two pointers 130. One of the pointers 130 may point to the node 116B and one of the pointers 130 may point to the node 116C. Depending on which of the conditions 128 are satisfied, the rule assessment server 108 may proceed to either of the nodes 116B or 116C from the node 116A. Nodes 116 that terminate a branch of the rule tree (e.g., nodes 116C and 116D) may have a null callback rule 126 or a null pointer 130.

Figure 1D:
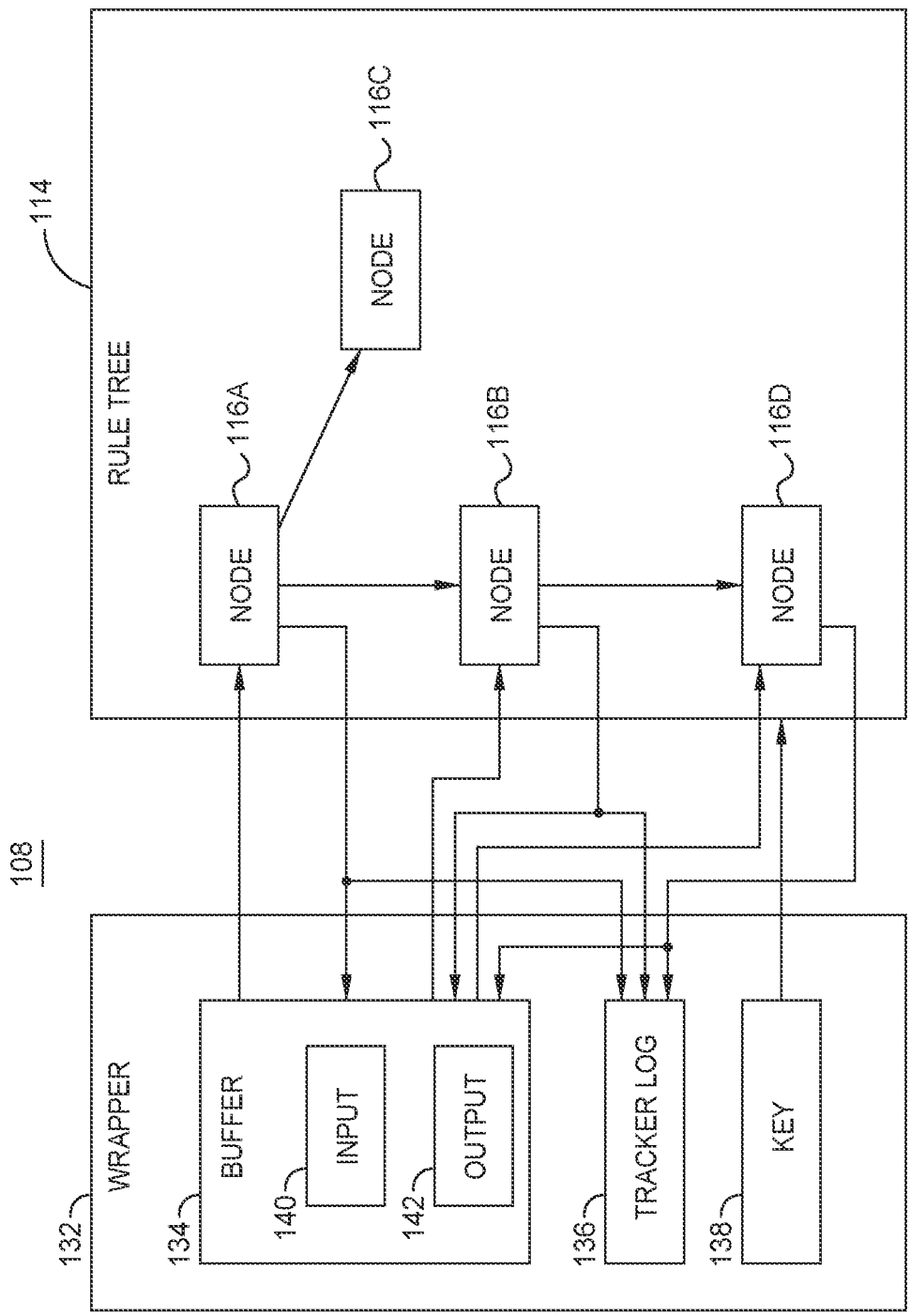
FIG. 1D illustrates an example operation of the rule assessment server in the system of FIG. 1A.

FIG. 1D illustrates an example operation of the rule assessment server 108 in the system 100 of FIG. 1A. The operation begins with the rule assessment server 108 receiving a wrapper 132. The device 104 may have provided the wrapper 132 to initiate evaluation of a rule tree 114. As seen in FIG. 1D the wrapper 132 includes a buffer 134, a tracker log 136, and a key 138. The buffer 134 includes an input 140 and an output 142. In certain embodiments, when the device 104 initially provides the wrapper 142, the buffer 134 may not include an output 142 or the output 142 may be null. As the rule assessment server 108 evaluates the nodes 116 of a rule tree 114, the rule assessment server 108 may generate and update the output 142 in the buffer 134.

The input 140 may include information to be used when evaluating the rules 118 of the nodes 116 of a rule tree 114. For example, the input 140 may include a dataset that the rule assessment server 108 uses to evaluate whether certain conditions 120 of the rules 118 are satisfied. Using the previous example of an email application, the input 140 may include the emails in the Inbox. As the rule assessment server 108 evaluates the nodes 116 of a rule tree 114 and performs certain actions 122 specified in the rules 118 in the nodes 116, the rule assessment server 108 may update the input 140 and the output 142. For example, if an email in the Inbox is deleted or moved, then that email may be removed from the input 140. As another example, if an automatic reply is sent, then the automatic reply may be added to the output 142. The rule tree 114 evaluates a subsequent node 116 in the rule tree 114 against the updated input 140 or the updated output 142. This process of updating the input 140 or the output 142 and evaluating the updated input 140 or output 142 against subsequent nodes 116 continues until the rule assessment server 108 reaches a node 116 that terminates a branch of the rule tree 114.

As the rule assessment server 108 evaluates the nodes 116 in the rule tree 114 using the input 140 and the output 142, the rule assessment server 108 updates the tracker log 136. For example, when the rule assessment server 108 evaluates a node 116, the rule assessment server 108 may add an indication of the input 140, the rule 118, the action 122, or the results of performing the action 122 to the tracker log 136. As discussed previously, the node 116 may include a trace definition 104 that specifies the type of information that should be added to the tracker log 136 when the node 116 is evaluated. The rule assessment server 108 analyzes the trace definition 124 in the node 116 and adds the information specified by the trace definition 124 to the tracker log 136. As a result, the tracker log 136 may be used to debug the rule tree 114, in particular embodiments.

In particular embodiments, when the tracker log 136 is initially provided by the device 104, the tracker log 136 is empty. For example, the tracker log 136 may be an empty list of strings or an empty vector. The device 104 may provide any suitable type of data structure for the empty tracker log 136. In some embodiments, the type of data structure used for the empty tracker log 136 influences the type of data that is added to the tracker log 136. For example, if the empty tracker log 136 is an empty list of strings, then the rule assessment server 108 adds strings to the tracker log 136. If the empty tracker log 136 is an empty vector, then the rule assessment server 108 adds vector entries into the tracker log 136.

The key 138 identifies the rule tree 114. As discussed previously, the key 138 identifies a particular rule tree 114 stored in the rule assessment server 108. The rule assessment server 108 compares the key 138 with identifiers of the rule trees 114 stored in the rule assessment server 108 to determine an identifier that matches the key 138. The rule assessment server 108 then determines that the rule tree 114 with the matching identifier is the rule tree 114 that is to be evaluated.

As an example operation, after receiving the wrapper 132, the rule assessment server 108 locates the rule tree 114 identified by the key 138. In the example of FIG. 1D, the key 138 identifies the rule tree 114 shown in the example of FIG. 1B. The rule assessment server 108 then evaluates the nodes 116 of the rule tree 114 using the input 140 and the output 142. The rule assessment server 108 begins by passing the buffer 134 to the node 116A in the rule tree 114. As discussed previously, the node 116A is the root node of the rule tree 114. The rule assessment server 108 evaluates the rule 118 in the node 116A against the input 140 provided by the device 104. Specifically, the rule assessment server 108 determines whether the input 140 satisfies the condition 120 of the rule 118 in the node 116A. If the condition 120 is satisfied, the rule assessment server 108 performs the action 122 of the rule 118 in the node 116A. If the condition 120 is not satisfied, the rule assessment server 108 does not perform the action 122. The rule assessment server 108 updates the buffer 134, the input 140, and the output 142 based on whether the action 122 was performed. For example, if the action 122 was not performed, then the input 140 and the output 142 may not change. If the action 122 was performed, then performing the action 122 may cause the input 140 or the output 142 to change. In response, the rule assessment server 108 performs the action 122 and then updates the input 140 or the output 142 to reflect the changes caused by performing the action 122.

The rule assessment server 108 then updates the tracker log 136 based on the evaluation of the rule 118 in the node 116A. The rule assessment server 108 may add information to the tracker log 136. The information may have been specified by the trace definition 124 of the node 116A. For example, the rule assessment server 108 may add to the tracker log 136 the input 140 or the output 142 provided by the device 104, the rule 118 in the node 116A including the condition 120 or the action 122, or the results of performing the action 122 such as the updated input 140 or the updated output 142. As a result, the tracker log 136 includes information that can be used to debug or troubleshoot the evaluation of the node 116A.

The rule assessment server 108 then evaluates which node 116 of the rule tree 114 should be evaluated next. The rule assessment server 108 evaluates one or more call back rules 126 of the node 116A to determine whether to proceed to the node 116B or the node 116C. For example, the rule assessment server 108 may evaluate the updated input 140 or the updated output 142 to determine whether a condition 128 of a callback rule 126 of the node 116A is satisfied. If the condition 128 is satisfied, the rule assessment server 108 may proceed to a node 116 to which the pointer 130 of the callback rule 126 points. In some embodiments, the node 116A includes multiple callback rules 126. The rule assessment server 108 evaluates each of the callback rules 126 to determine which of the conditions 128 of the callback rules 126 is satisfied. The rule assessment server 108 then proceeds to the node 116 to which the pointer 130 corresponding to the satisfied condition 128 points. In the example of FIG. 1D, the rule assessment server 108 determines that the node 116B should be evaluated next. Stated differently, the rule assessment server 108 determines that a condition 128 corresponding to a pointer 130 that points to the node 116B is satisfied by the updated input 140 or the updated input 142. The rule assessment server 108 then proceeds to evaluate the node 116B.

The rule assessment server 108 evaluates the rule 118 of the node 1166 against the updated input 140 or the updated input 142. If a condition 120 of the rule 118 of the node 1166 is satisfied, the rule assessment server 108 performs an action 122 corresponding to the satisfied condition 120. After performing the action 122 the rule assessment server 108 updates the input 140 or the output 142. The rule assessment server 108 then updates the tracker log 136 with information specified by the trace definition 124 of the node 1166. The rule assessment server 108 then evaluates one or more callback rules 126 of the node 116B to determine that the node 116D should be evaluated next.

The rule assessment server 108 then evaluates the input 140 or the output 142 updated after evaluating the node 116B against the rule 118 of the node 116D. The rule assessment server 108 may perform the action 122 specified in the rule 118 of the node 116D and add information to the tracker log 136 specified by the trace definition 124 of the node 116B. The rule assessment server 108 may determine that the node 116D has no callback rule 126 or has a null pointer 130. In response, the rule assessment server 108 may determine that evaluation of the rule tree 114 is complete and provide the device 104 the final input 140 and output 142. In this manner, the rule assessment server 108 evaluates the rules 118 of the nodes 116 of the rule tree 114 in a deterministic order, which provides consistent results when the same input 140 is provided to the rule tree 114. Additionally, the tracker log 136 allows the rule assessment server 108 to replay or troubleshoot the rule tree 114 after evaluation is complete. For example, because the intermediate results of processing the rules in the rule tree 114 remains consistent due to the deterministic order in which the rules are processed, the processing of the rules is traceable.

Figure 1E:
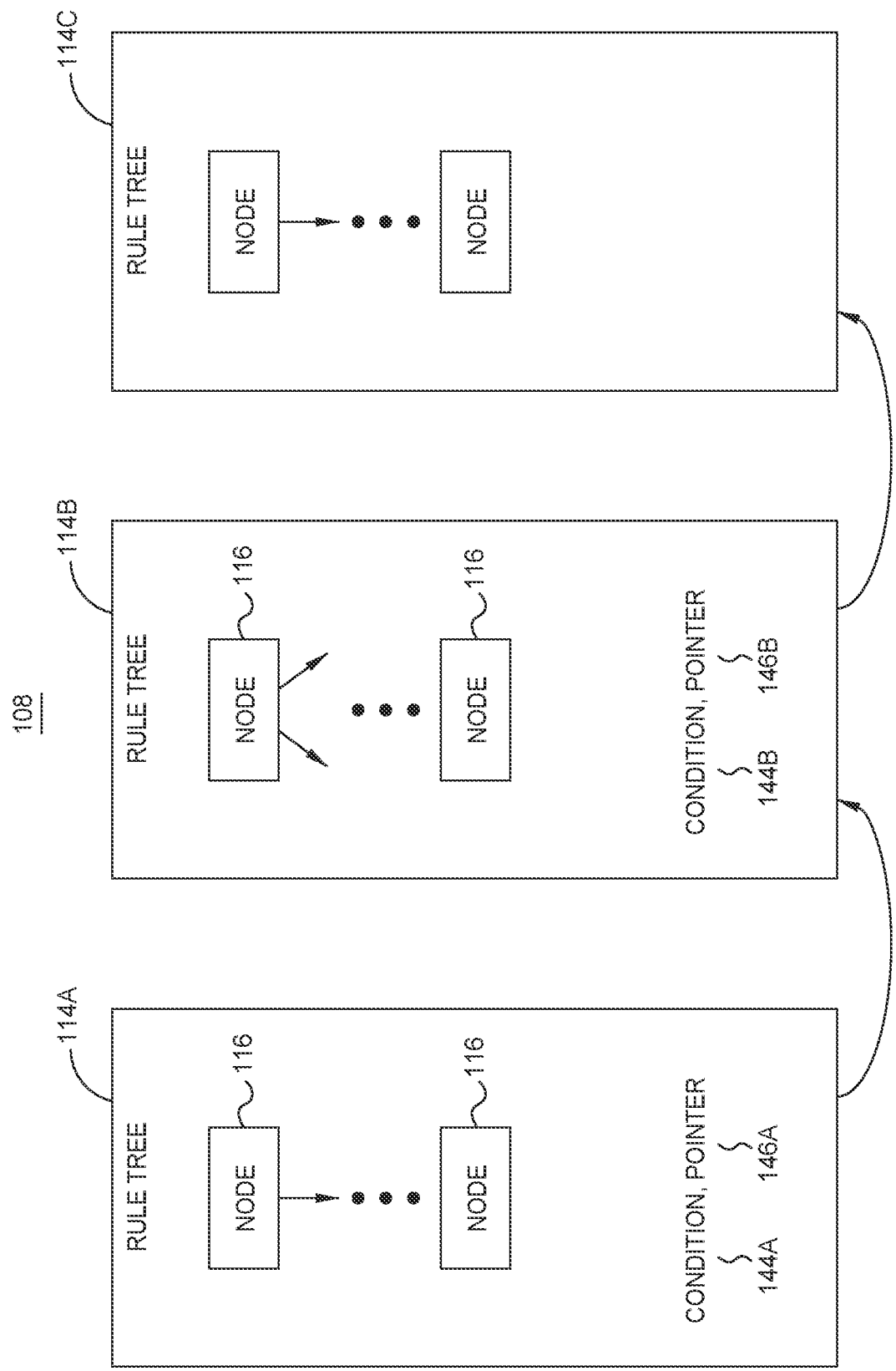
FIG. 1E illustrates an example rule assessment server in the system of FIG. 1A.

FIG. 1E illustrates an example rule assessment server 108 in the system 100 of FIG. 1A. In some embodiments, a rule tree 114 includes one or more pointers to other rule trees in the rule assessment server 108. The user 102 may have set up these pointers when creating the rule tree 114 and the other rule trees to chain these rule trees together. When the rule assessment server 108 finishes evaluating the rule tree 114, the rule assessment server 108 follows one or more of these pointers to begin evaluating another rule tree using the input 140 and the output 142 resulting from the evaluation of the rule tree 114. In this manner, the user 102 chains different rule trees together to indicate a deterministic order in which the rule trees themselves are evaluated. In some embodiments, the user 102 can set a condition for a pointer to another rule tree. If the condition is satisfied (e.g., by the input 140 or the output 142 resulting from the evaluation of the rule tree 114), then the rule assessment server 108 follows the pointer to evaluate the other rule tree. If the condition is not satisfied, then the rule assessment server 108 does not follow that pointer to evaluate the other rule tree.

As seen in the example of FIG. 1E, the rule assessment server 108 maintains rule trees 114A, 114B, and 114C. The rule tree 114A includes a condition 144A and a pointer 146A. When the rule assessment server 108 finishes evaluating the nodes 116 in the rule tree 114A, the rule assessment server 108 determines whether the condition 144A is satisfied (e.g., by the input 140 or the output 142 resulting from the evaluation of the rule tree 114A). If the condition 144A is satisfied, the rule assessment server 108 continues to evaluate the rule tree 114B, to which the pointer 146A points. The rule tree 114B includes a condition 144B and a pointer 146B. After the rule assessment server 108 finishes evaluating the nodes 116 in the rule tree 114B (e.g., using the input 140 or the output 142 resulting from the evaluation of the rule tree 114A), the rule assessment server 108 determines whether the condition 144B is satisfied (e.g., by the input 140 or the output 142 resulting from the evaluation of the rule tree 114B). If the condition 144B is satisfied, the rule assessment server 108 continues to evaluate the rule tree 114C, to which the pointer 146B points. The rule tree 114C may not include a condition or pointer to another rule tree. After the rule assessment server 108 finishes evaluating the rule tree 114C, the rule assessment server 108 provides the output of assessing the rule trees 114A, 114B, and 114C to the user 102 or the device 104. By linking the rule trees 114A, 114B, and 114C, the rule assessment server 108 evaluates the rules in the rule trees 114A, 114B, and 114C in a deterministic order.

Moreover, the node 116 structure allows the user 102 to reuse certain rules 118 across different rule trees 114 by including the node 116 in the different rule trees 114. In this manner, the user 102 can use the same rule 118 (and trace definition 124) across multiple rulesets.

Figure 2:
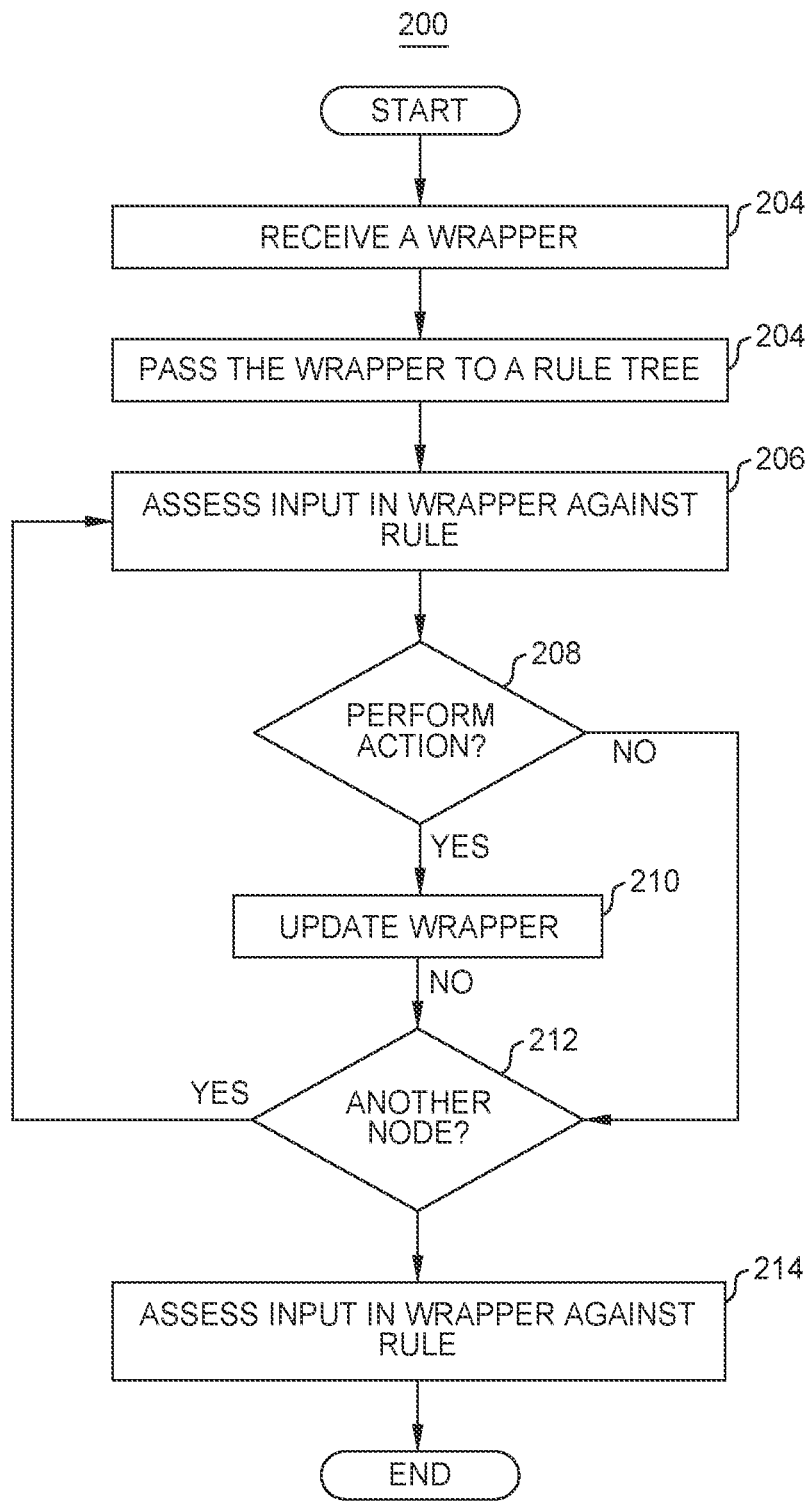
FIG. 2 is a flowchart of an example method performed in the system of FIG. 1A.

FIG. 2 is a flowchart of an example method 200 performed in the system 100 of FIG. 1A. In certain embodiments, the rule assessment server 108 performs the method 200. By performing the method 200, the rule assessment server 108 evaluates a collection of rules in a deterministic order, which provides consistent results when the same inputs are provided to the rule assessment server 108.

The rule assessment server 108 begins by receiving a wrapper 132 in block 202. The wrapper 132 includes a buffer 134, a tracker log 136, and a key 138. The buffer 134 includes an input 140 to the evaluation process. The buffer 134 may also include an output 142. In some embodiments, the output 142 is initially null or empty. The tracker log 36 may initially be empty or null. The key 138 identifies a rule tree 114. The rule assessment server 108 determines the rule tree 114 that is identified by the key 138. The rule assessment server 108 then passes the wrapper 132 to the determined rule tree 114 in block 204.

In block 206, the rule assessment server 108 assesses the input 140 in the wrapper 132 against a rule 118 in a first node 116 of the rule tree 114. For example, the rule assessment server 108 may determine whether the input 140 satisfies a condition 120 of the rule 118. The rule assessment server 108 determines in block 208 whether to perform an action 122 of the rule 118. If the input 140 satisfies the condition 120 of the rule 118, the rule assessment server 108 may determine that the action 122 should be performed. If the input 140 does not satisfy the condition 120 of the rule 118, the rule assessment server 108 determines that the action 122 should not be performed. If the rule assessment server 108 determines that the action 122 should be performed, the rule assessment server 108 performs the action 122 and then updates the wrapper 132 in block 210. For example, the rule assessment server 108 may update the input 140 and the output 142 after performing the action 122. The action 122 may cause changes to the input 140 or the output 142. After performing the action 122, the rule assessment server 108 updates the input 140 or the output 142 with the results of performing the action 122.

After updating the wrapper 132 or if the rule assessment server 108 determines that the action 122 should not be performed, the rule assessment server 108 determines whether another node 116 in the rule tree 114 should be evaluated in block 212. For example, the rule assessment server 108 may evaluate the callback rule 126 of the node 116 by determining whether the updated input 140 or the updated output 142 satisfies a condition 128 of the callback rule 126. If the condition 128 is satisfied, the rule assessment server 108 may proceed to a node to which a pointer 130 of the callback rule 126 points. The rule assessment server 108 proceeds to the next node 116 and returns to block 206 to assess the input 140 or the output 142 against a rule 118 in the next node 116. The rule assessment server 108 repeats blocks 206, 208, 210 or 212 for the next node 116. This process continues until the rule assessment server 108 determines that a currently evaluated node has a null pointer 130, indicating that there is not another node 116 for the rule assessment server 108 to evaluate. The rule assessment server 108 then provides the output 132 of the rule tree 114 to the device 104. The output 142 is the result of evaluating the rules 118 of the nodes 116 and the rule tree 114 in an order specified by the rule tree 114.

Figure 3:
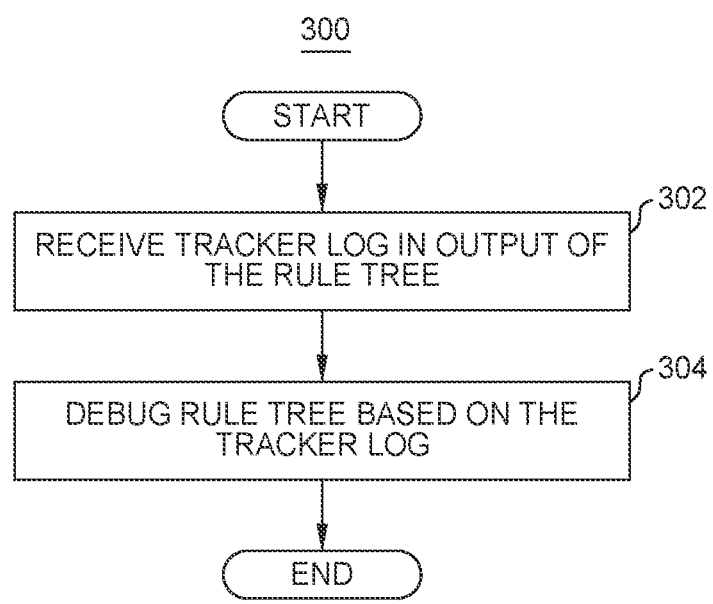
FIG. 3 is a flowchart of an example method performed in the system of FIG. 1A.

FIG. 3 is a flowchart of an example method 300 performed in the system 100 of FIG. 1A. In certain embodiments, the rule assessment server 108 performs the method 300. By performing the method 300, the rule assessment server 108 troubleshoots a rule tree 114.

In block 302, the rule assessment server 108 receives a tracker log 136 as part of the output of evaluating a rule tree 114. The tracker log 136 includes information concerning the evaluation of the nodes 116 of the rule tree 114. For example, the tracker log 136 may include the input 140 provided to each node 116 of the rule tree 114. Additionally, the tracker log 136 may include the rules 118 of the nodes 116 that were evaluated along with the actions 122 of the nodes 116 that were performed or not performed. Moreover, the tracker log 136 may indicate the results of performing certain actions 122 of the nodes 116 of the rule tree 114. The tracker log 136 may organize this information based on the sequence in which the nodes 116 were evaluated in the rule tree 114. The information in the tracker log 136 may have been added by the rule assessment server 108, based on the traced definitions 124 of the nodes 116 in the rule tree 114.

In block 304, the rule assessment server 108 debugs the rule tree 114 based on the tracker log 136. For example, the rule assessment server 108 may step through the tracker log 136 to determine which nodes 116 were evaluated and in what order those nodes 116 were evaluated. Additionally, the rule assessment server 108 may determine the order in which the rules 118 of the nodes 116 were applied to the input 140 and how the input 140 changed as various actions 122 were performed. The tracker log 136 thus provides the rule assessment server 108 the ability to determine how each rule 118 influenced the input 140 or the output 142. By stepping through the evaluation of the rule tree 114, the rule assessment server 108 can determine where errors are located within the rule tree 114. The rule assessment server 108 may then correct these errors or make suitable changes.

This disclosure uses the terms "assess," "evaluate," and "apply" interchangeably with respect to the rule assessment server 108 determining whether to perform an action based on a rule and input data. For example, the rule assessment server 108 may "assess," "evaluate," or "apply" the rule against or to the input data when the rule assessment server 108 determines whether the input data satisfies a condition indicated by the rule. If the condition is satisfied, then the rule assessment server 108 performs an action indicated by the rule. If the condition is not satisfied, then the rule assessment server 108 does not perform the action.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In the context of the present invention, a user may access applications (e.g., a matting application) or related data available in the cloud. For example, a matting application could execute on a computing system in the cloud to perform image matting, and store alpha mattes determined via such matting at a storage location in the cloud. Doing so allows a user to access this information from any computing system attached to a network connected to the cloud (e.g., the Internet).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method comprising:
   selecting a rule tree from a plurality of rule trees based on a received key;
   assessing an input in a buffer against a rule in a first node of the rule tree to determine that an action should be performed;
   updating the buffer with results of performing the action;
   inserting an indication of the input, the rule, and the results of performing the action into a tracker log; and
   passing the updated buffer to a second node in the rule tree in response to determining that the first node points to the second node.

2. The method of claim 1, further comprising assessing the updated buffer against a callback rule in the first node to determine that the first node points to the second node.

3. The method of claim 1, wherein updating the buffer comprises updating the input based on the results of performing the action.

4. The method of claim 3, further comprising assessing the updated input against a second rule in the second node to determine that a second action in the second node should be performed.

5. The method of claim 1, wherein the rule comprises a condition and the action and wherein the input is assessed against the condition to determine that the action should be performed.

6. The method of claim 1, further comprising debugging the rule tree based on the tracker log.

7. The method of claim 1, wherein the tracker log, when received, is at least one of an empty list of strings or an empty vector.

8. An apparatus comprising:
   a memory; and
   a hardware processor communicatively coupled to the memory, the hardware processor configured to:
   select a rule tree from a plurality of rule trees based on a received key;
   assess an input in a buffer against a rule in a first node of the rule tree to determine that an action should be performed;
   update the buffer with results of performing the action;
   insert an indication of the input, the rule, and the results of performing the action into a tracker log; and
   pass the updated buffer to a second node in the rule tree in response to determining that the first node points to the second node.

9. The apparatus of claim 8, wherein the hardware processor is further configured to assess the updated buffer against a callback rule in the first node to determine that the first node points to the second node.

10. The apparatus of claim 8, wherein updating the buffer comprises updating the input based on the results of performing the action.

11. The apparatus of claim 10, wherein the hardware processor is further configured to assess the updated input against a second rule in the second node to determine that a second action in the second node should be performed.

12. The apparatus of claim 8, wherein the rule comprises a condition and the action and wherein the input is assessed against the condition to determine that the action should be performed.

13. The apparatus of claim 8, wherein the hardware processor is further configured to debug the rule tree based on the tracker log.

14. The apparatus of claim 8, wherein the tracker log, when received, is at least one of an empty list of strings or an empty vector.

15. A method comprising:
   receiving a buffer and a key, wherein the buffer comprises an input;
   selecting a rule tree from a plurality of rule trees based on the key;
   passing the buffer to a first node in the rule tree identified;
   assessing the input against a rule in the first node to determine that an action should be performed;
   updating the buffer with results of performing the action; and
   passing the updated buffer to a second node in the rule tree in response to determining that the first node points to the second node.

16. The method of claim 15, further comprising:
   inserting an indication of the input, the rule, and the results of performing the action into a tracker log; and
   passing the tracker log to the second node in the rule tree.

17. The method of claim 15, further comprising assessing the updated buffer against a callback rule in the first node to determine that the first node points to the second node.

18. The method of claim 15, wherein updating the buffer comprises updating the input based on the results of performing the action.

* * * * *

UNITED STATES PATENT AND TRADEMARK OFFICE
CERTIFICATE OF CORRECTION

PATENT NO. : 11,734,155 B2
APPLICATION NO. : 17/382995
DATED : August 22, 2023
INVENTOR(S) : Edward Huang et al.

It is certified that error appears in the above-identified patent and that said Letters Patent is hereby corrected as shown below:

In the Specification

In Column 8, Line 38, delete "1166" and insert -- 116B --.

In Column 8, Line 39, delete "1166" and insert -- 116B --.

In Column 8, Line 46, delete "1166." and insert -- 116B. --.

Signed and Sealed this
Twenty-first Day of May, 2024

*Katherine Kelly Vidal*

Katherine Kelly Vidal
*Director of the United States Patent and Trademark Office*